United States Patent [19]
Cohen et al.
[11] Patent Number: 4,596,733
[45] Date of Patent: Jun. 24, 1986

[54] ELECTROEROSION RECORDING MATERIAL WITH POLYORGANOSILOXANE OVERLAYER

[75] Inventors: Mitchell S. Cohen, Ossining; Keith S. Pennington, Somers; Krishna G. Sachdev, Wappingers Falls; William D. Weber, Hyde Park, all of N.Y.

[73] Assignee: International Business Machines Corporation, Armonk, N.Y.

[21] Appl. No.: 567,213

[22] Filed: Dec. 30, 1983

[51] Int. Cl.[4] .............................................. G01D 15/34

[52] U.S. Cl. ................................ 428/209; 346/135.1; 346/162; 346/163; 428/219; 428/336; 428/447; 428/450

[58] Field of Search ............... 428/447, 450, 209, 336, 428/219; 427/121; 346/135.1, 162, 163

[56] References Cited

U.S. PATENT DOCUMENTS

| | | | |
|---|---|---|---|
| 2,555,321 | 6/1951 | Dalton et al. | 427/121 |
| 3,125,021 | 3/1964 | Dalton | 427/121 |
| 3,242,075 | 3/1966 | Hunter | 427/388.2 |
| 3,511,700 | 5/1970 | Miro | 428/209 |
| 3,514,325 | 5/1970 | Davis et al. | 346/135.1 |
| 3,740,254 | 6/1973 | Lansbury et al. | |
| 3,786,518 | 1/1974 | Atherton | 346/135.1 |
| 3,861,952 | 1/1975 | Tokumoto et al. | 428/209 |
| 4,069,360 | 1/1978 | Yanagisawa et al. | 428/900 |
| 4,152,487 | 5/1979 | Yanagisawa | 428/900 |
| 4,206,256 | 6/1980 | Matthies et al. | 428/450 |
| 4,305,082 | 12/1981 | Kusakawa et al. | 346/135.1 |
| 4,339,758 | 7/1982 | Bhatia et al. | 346/135.1 |
| 4,380,558 | 4/1983 | Yanagisawa | 428/900 |
| 4,400,706 | 8/1983 | Takemara et al. | 346/135.1 |
| 4,473,676 | 9/1984 | Steklenski | 428/447 |
| 4,479,851 | 10/1984 | Smith et al. | 428/447 |
| 4,486,503 | 12/1984 | Vaugn, Jr. | 428/450 |
| 4,488,158 | 12/1984 | Wirnowski | 346/135.1 |
| 4,492,733 | 1/1985 | Phillips et al. | 428/450 |

*Primary Examiner*—George F. Lesmes
*Assistant Examiner*—William M. Atkinson
*Attorney, Agent, or Firm*—Curtis Ailes

[57] ABSTRACT

For high speed electroerosion recording, this invention provides a polyorganosiloxane overlayer which includes high lubricity solid particles as a filler. The overlayer provides a combination lubricant and protective layer for the thin metal layer which is removed by electroerosion to prevent damage for the areas not removed by electroerosion. The polyorganosiloxane overlayer is preferably crosslinked, and is relatively hard, durable, and especially resistant to thermal degradation by the electroerosion arcing. This is important to avoid debris buildup at the recording electrodes resulting from the high temperature arcing for removal of the overlayer in the areas where recording takes place.

20 Claims, 3 Drawing Figures

DIRECT NEGATIVE

ELECTROEROSION RECORDING MATERIAL WITH POLYORGANOSILOXANE OVERLAYER

DESCRIPTION

1. Technical Field

This invention relates to electroerosion recording and to recording materials exhibiting improved overlayer lubricity and thermal stability for use in such processes, and especially for use in producing direct masters or direct camera-ready negatives for purposes such as offset printing.

Electroerosion recording is a well-known technique for producing markings, such as letters, numbers, symbols, and patterns, such as circuit patterns, or other legible or coded indicia on recording material in response to an electric signal which removes or erodes material from the surface of the recording material as the result of spark initiation.

The surface which is eroded or removed to provide such indicia on the recording material is usually a thin film of conductive material which is vaporized in response to localized heating associated with sparking (arcing) initiated by applying an electric voltage to an electrode in contact with the surface of a recording material comprising the thin conductive film on a non-conductive backing or support. The thin conductive film is usually a thin film of vaporizable metal, such as aluminum.

Electroerosion recording is effected by the movement of a stylus or a plurality of styli relative to the surface of specially prepared recording media. Electrical writing signals are fed to the stylus to provide controlled electrical pulses which generate sparks at the surface of the recording material to selectively heat and remove by evaporation a layer of the recording material. The locations from which material is removed correspond to the indicia or images which are to be recorded.

In the course of this process, the stylus is moved relative to a surface of the recording material and in contact with the removable layer.

In an actual system, there may be as many as thirty or more different styli arranged to provide a pattern of printing one line at a time, and with considerable definition. As the styli move relative to the recording material, a writing control directs pulses of voltage to individual styli at a level sufficient to cause arcing and evaporation of the layer of conductive material to record the desired pattern of information.

2. Prior Art

Among the prior disclosures relevant to electroerosion recording, U.S. Pat. No. 2,983,220, Dalton et al, discloses a lithographic coating on an electroerosion recording sheet. The coating may be a copolymer containing zinc oxide and zinc sulfide. An internal layer containing conductive material, such as, graphite, is disclosed in U.S. Pat. No. 3,048,515, Dalton. An electroresponsive recording blank having a removable masking layer containing a luminescent material is described in U.S. Pat. No. 2,554,017, Dalton. Other prior art providing further general background in the field of electroerosion recording includes U.S. Pat. Nos. 3,138,547, Clark and 3,411,948, Reis.

In electroerosion recording, due to the fragility of the thin conductive layer and variations in stylus pressure, considerable scratching (undesired removal of the conductive layer) is observed to take place when no writing signal is present. This problem is particularly troublesome with high speed and high resolution electroerosion recording. Such scratching is purely mechanical and non-electrical in nature, and manifests itself by unwanted removal of the conducting metal layer by the abrasive action of the styli.

It has been recognized, therefore, that the use of a lubricant and/or protective overlayer on the surface of such electroerosion recording material would be helpful to reduce scratching by the styli. Application of lubricants comprising long chain fatty acids such as stearic acid and palmitic acid were found to reduce the scratching somewhat. But considerable stylus scratching of the thin aluminum film of electroerosion recording materials continues to be observed. Therefore, efforts continue to be directed to a finding a superior lubricant-protective layer composition for the surface of electroerosion recording materials for improved durability, mechanical strength and shelf life. Such protective layers are usually referred to herein as "overlayers", but are sometimes referred to as "overcoats".

One worthwhile recent improvement in lubricant-protective overcoat layers employs a polymeric organic binder with a high proportion of solid lubricant filler, such as graphite. The binder is usually a cellulosic material. That improvement is disclosed and claimed in U.S. patent application Ser. No. 454,744 filed Dec. 30, 1982, now abandoned, by M. S. Cohen, for "Recording Materials of Improved Lubricity for use in Electroerosion Printing" and assigned to the same assignee as the present application. That prior co-pending patent application is incorporated herein by reference. While the lubricant overlayer materials of that invention provide a substantial improvement in print quality, it is desirable to provide even further improvements, especially in terms of reduced stylus fouling and in reducing adherence to the stylus of overlayer debris generated during the electroerosion recording process.

Further prior art is discussed below at the end of the summary of the invention. One object of the invention is to provide new electroerosion recording materials having improved binders for the lubricant layer having a higher glass transition temperature and better thermal stability and a higher softening temperature to provide greater freedom from fouling problems, and to thereby provide superior print quality and performance.

SUMMARY OF THE INVENTION

One object of the invention is to produce electroerosion recording materials of improved resistance to stylus scratching by use of improved lubricating overlayers in accordance with this invention.

Another object is to provide an electroerosion recording material with an improved lubricant overlayer for improved wear resistance and shelf life.

Another object is to provide lubricant surface coatings for electroerosion materials which have improved adhesion to aluminum.

Another object is to provide improved overlayer compositions for electroerosion materials.

Another object is to provide improved high contrast direct negatives by electroerosion recording.

Another object is to provide improved direct offset printing masters by electroerosion recording.

In carrying out the invention, there is provided an improved electroerosion recording material comprising a non-conductive support member, a thin layer of conductive material supported upon said support member and being removed by evaporation during electroerosion recording, an overlayer of protective lubricant composition on the stylus-contacting surface of said material, said lubricant composition comprising particles of high lubricity dispersed in a solid polyorganosiloxane binder, said polyorganosiloxane consisting essentially of a polymerization product of at least one trialkoxysilane monomer.

In accordance with the preferred embodiment of the invention, the polyorganosiloxanes are preferably crosslinked with a crosslinking agent to provide thermoset properties for the overlayer binder. The crosslinking to provide the thermoset properties is carried out without elevating the temperature of the material in the curing process much beyond 100 degrees C. This modest elevation of temperature is desirable to avoid damage to the substrate materials. In the preferred form of the invention, the improved electroerosion recording material includes a hard base layer beneath the thin layer of conductive material which is capable of being removed by evaporation when the print head is energized during electro-erosion recording. Such hard base layer preferably has a Knoop hardness in the range from 20 to 30 and may be formed of a crosslinked polymer in accordance with the teachings of U.S. Patent Application Ser. No. 454,743 filed on Dec. 30, 1982 now abandoned by M. S. Cohen et al for "Scratch Resistant Recording Materials for Electroerosion Printing Comprising Cross-Linked Polymer Base Layer." That prior co-pending patent application is incorporated herein by reference. The polymer base layer is preferably filled with a hard particulate material such as silica.

The conductive particles dispersed in the polyorganosiloxane binder in the overlayer in accordance with the present invention may be selected from the general class of laminar solids. Examples of such solids are $MoS_2$, $WS_2$, $TaS_2$ and graphite. Other soft compounds may be considered such as AgI, $PbCO_3$, ZnO, $CaF_2$ and PbO since they have all been shown to be lubricants. In addition, soft metal particles such as Sn, Cu, Zn, Ag, Pb, Au, Bi, and Al are expected to be useful in the invention. While ZnO, $MoS_2$, Al, and Zn, gave satisfactory results, the preferred particle material for practice of this invention has been found to be graphite. One of the major advantages of the present invention is that the debris from the overlayer removed in the recording region during electroerosion recording does not stick to the styli which are used to supply the voltage necessary for electroerosion. This is important, since any accumulation of eroded debri on the print head interferes with the printing operation. Such sticking and fouling of the styli with prior lubricant layers inhibits, and eventually stops, the recording process.

Furthermore, the overlayer compositions incorporated in the electroerosion material of this invention provide for both protection to the recording media during handling, and lubrication during the electroerosion process.

In general, the overlayers of the material of the present invention have improved hardness, thermal stability, and abrasion resistance. Furthermore, because of the low organic content of the overlayer films in the material of the present invention, the material has less of a tendency to cause fouling of the styli and also allows for a higher binder content in relation to the solid lubricant particles than have been achievable with satisfaction with other binders, such as, for instance, the cellulosic binders of the prior Cohen application Ser. No. 454,744, previously mentioned above.

OTHER PRIOR ART

U.S. Pat. No. 3,514,325 Davis et al discloses an electroerosion recording material in which a surface layer of crosslinked organic binder containing conductive zinc oxide particles is placed on top of the thin aluminum layer. However, that binder does not have the advantages of the polyorganosiloxane binder based overlayers of the present invention.

Other art is known in which compounds which include silicon as a constituent are employed in protective layers for recording media such as sound recordings, but none are known which are incorporated in electroerosion recording media. Examples of U.S. patents employing outer layers of compounds containing silicones in recording disks for information such as sound recordings are as follows: U.S. Pat. Nos. 4,351,048 Berry, 4,346,468 Preston et al, 4,327,140 Preston, and 4,304,806 Anderson et al.

U.S. Pat. No. 3,460,980, issued Aug. 12, 1969 to Alfred J. Burzynski, teaches the use of polyorganosiloxanes as protective coatings for metals, and also teaches that such coatings may include dyes, pigments, fillers, and similar additives. However, that patent does not include any teaching that such materials are appropriate as overlayers in electroerosion recording materials, and it does not teach polyorganosiloxane coating materials containing high lubricity particles and serving a lubricating function, as well as a protective function, as in the present invention.

DETAILED DESCRIPTION OF THE PREFERRED EMBODIMENTS OF THE INVENTION

Figure 1:
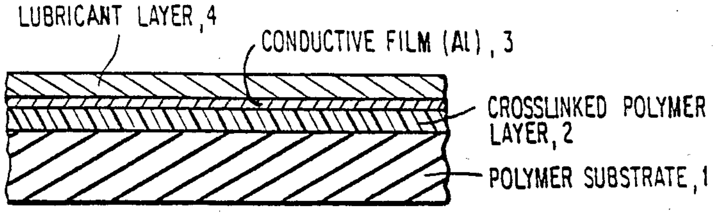
FIG. 1 of the drawing is a cross-sectional view of an electroerosion material in accordance with this invention. The drawing is not to scale, the thicknesses of the layers being exaggerated.

Referring more particularly to FIG. 1, the electroerosion recording material in accordance with this invention preferably includes a polymeric substrate 1 which may be a polyethylene terephthalate film such as that available from Du Pont under the trademark name Mylar. Upon the substrate 1, there is preferably provided an intermediate cross linked polymer layer 2 in accordance with the teachings of the above mentioned Cohen et al application Ser. No. 454,743. Above the layer 2, is the conductive film 3, which is preferably composed of a vapor deposited aluminum. Above the conductive film layer 3, there is provided the unique overlayer 4, which is a lubricant layer as well as a protective layer.

The substrate polyester film may have a typical thickness in the range from about 50 to 125 micrometers. The intermediate layer 2 may have a typical thickness in the range from about 5 to 15 micrometers. The vapor deposited aluminum film has a preferred thickness from about 100 to 500 Angstrom units. The thickness of the conductive layer is measured by its resistance per square unit area, preferably in the range of 1.3 to 4.5 ohms per square. This provides for clean vaporization and erosion of the aluminum according to this invention. The overlayer film has a preferred thickness corresponding to only about 2 micrograms to 15 micrograms per square centimeter.

Greater overlayer thicknesses do not provide for good writing characteristics at low writing voltages (about 50 volts) and short pulse lengths (about 20 microseconds). A coating thickness which is less than the above range does not give adequate protection and lubrication necessary for improved resistance to surface abrasion by the writing electrodes.

Figure 2:
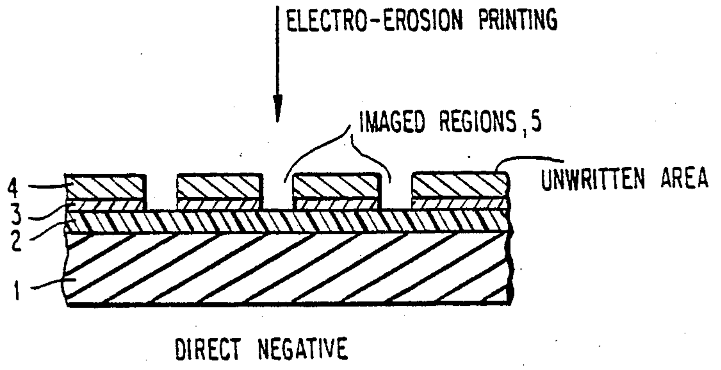
FIG. 2 is a cross-sectional view of a direct negative made from the material of FIG. 1 in accordance with this invention.

When employed as printing material using an electroerosion device at 30–60 volts the material of FIG. 1 may be imaged by clean erosion of the aluminum layer 3 which, as shown in FIG. 2 of the drawing, is accompanied by the removal of overlayer 4 in the written or imaged regions 5, thereby exposing the transparent substrate 1 and polymer layer 2 with consequent production of a defect-free direct negative. That negative may be used immediately for the photographic production of a positive offset printing master.

Figure 3:
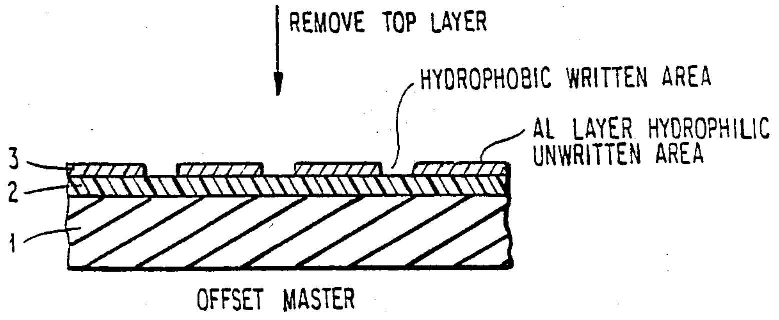
FIG. 3 is a cross-sectional view of an offset master made from the material of FIG. 1 in accordance with this invention.

FIG. 3 illustrates the production of an offset printing master by removal of the overlayer. For use of the printed or imaged material of FIG. 2 as an offset master on a printing press in the known process requiring a water-ink cycle, it is necessary to obtain hydrophobic-hydrophilic mapping so that when an oleophilic ink is employed, the written area remains ink receptive while the unwritten area is water wettable and non-receptive to oil based inks. Since the direct imaged region of the electroerosion printing material of the present invention contains a hydrophobic base layer, removal of the lubricant overlayer 4 from the unwritten areas, as is shown in FIG. 3 of the drawing, using suitable solvents, exposes areas of hydrophilic aluminum film 6 resulting in the formation of an offset printing master plate.

The polyorganosiloxanes used as binders for solid lubricants in the overlayer 4 of this invention are formed primarily from organotrialkoxysilane monomers such as shown by the following formula:

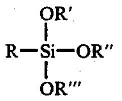

(1)

where R is $-CH_3$, $-C_2H_5$, $-C_3H_7$, $-CH_2CH_2CF_3$, $-C_6H_5$, or $-CH{=}CH_2$, and where R′, R″, and R‴ each equal $CH_3$ or $C_2H_5$.

A mixture of various organotrialkoxysilanes and organodialkoxysilanes can also be employed such that the former category constitutes the major component (in the order of 80%) in the mixture.

Typical organodialkoxysilanes according to this invention include:

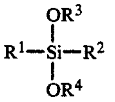

(2)

where $R^1$ and $R^2$ each equal $-CH_3$, $-C_2H_5$, $-CH_2CH_2CF_3$, $-C_6H_5$, or $-CH{=}CH_2$, and where $R^2$ and $R^4$ each equal $-CH_3$ or $-C_2H_5$.

These binders have available reactive sites such as Si—OH or Si-O-alkyl to provide for in situ curing of the film upon solvent evaporation under ambient temperatures, or at higher temperatures. The reactive sites are especially effective in providing for rapid curing in the presence of crosslinking chemical agents when the overlayer coatings are subjected briefly to temperatures not exceeding 120 degrees C, resulting in a thermoset, hardened polymer matrix. A typical coating composition for the lubricant overlayer is obtained by dispersing finely divided solid lubricant particles such as graphite in a solution of the polyorganosiloxane binder in a suitable organic solvent. A preferred range for the molecular weight of the polyorganosiloxane binder constituent is about 1,500 to 12,000. These materials can be synthesized by a condensation reaction of trialkoxysilanes or trialkoxy and dialkoxysilanes, or the corresponding tri- and dichlorosilanes, in the presence of a catalyst according to the general procedures for silicone resins as described in "Polymer Synthesis", Volume II, by S. R. Sandler and W. Caro, pp. 114–139, Academic Press, New York, N.Y., 1977.

The polyorganosiloxane composition preferred for the overlayer of this invention is typically derived from 80% of trialkoxysilanes and 20% of dialkoxysilanes, and contains the following relative proportion of the hydrocarbon radicals according to a representative structure shown as follows:

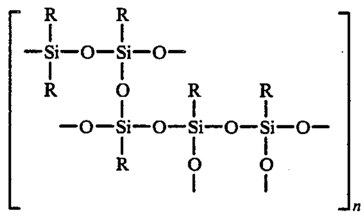

(3)

In the above mentioned formula, n=10 to 50.

R in the above formula, in each of the six sites, represents any one of the following listed hydrocarbon radicals, the hydrocarbon radicals being present in weight proportions as given in the following table:

| Hydrocarbon Radical | Weight in Percent |
|---|---|
| $-CH_3$ | 70 |
| $-C_6H_5$ | 15 |
| $-CH_2CH_2CF_3$ | 10 |
| $-CH{=}CH_2$ | 5 |

Some of the commercially available polyorganosiloxane resins having a high Silicon-oxygen content, such as the "Glass Resin" polymer products of Owens Illinois Inc. can also be employed. Typical members of this group are Glass Resins 650, 908, and 100. Glass resin 650 is a polymerization product of methyltriethoxysilane with a molecular weight of about 12,000. Glass resin 908 is a polymerization product of phenyltriethoxysilane and methyltriethoxysilane in a ratio of 4 to 1, and having a molecular weight of about 1,000. Glass resin 100 is a polymerization product of methyltriethoxysilane and phenyltriethoxysilane in a ratio of 2 to 1. For modification of film properties in terms of wettability, hardness, and curing characteristics, crosslinking agents having difunctional or trifunctional siloxy units are blended into the resin-particle dispersions. Various such agents useful according to this invention are represented by the general formula:

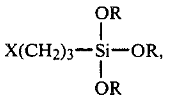

(4)

where X is $—NH_2$, $—NHCH_3$, $—N(CH_2CH_2OH)_2$, or $—N(CH_2CH_2)_2O$, and R is $—CH_3$, or $—C_2H_5$.

Specific examples of such additives to accelerate the crosslinking process and confer other desirable characteristics include:

Bis(2-hydroxyethyl)aminopropyltriethoxysilane
N-(3-trimethoxysilylpropyl)morpholine
gamma-Aminopropyltriethoxysilane (A-1100 From Union Carbide Corporation)
gamma-N-Methylaminopropyltrimethoxysilane The overlayer binders of the present invention provide a marked improvement in thermal stability over previously known overlayer binders, such as the cellulosic binders disclosed in the prior U.S. patent application Ser. No. 454,744, previously mentioned above. Even without one of the crosslinking agents listed above, when the binder is primarily polytrialkoxysilane, the thermal stability, as shown by a standard thermogravimetric analysis, shows only about an 8% weight loss up to a test temperature of 700 degrees C., with only about 3.5% weight loss up to 300 degrees C. When crosslinked with A-1100 (one of the above listed crosslinking agents), the weight loss in such a test is only about 1% at 300 degrees C., and only about 8% at 700 degrees C. By comparison, a typical cellulosic polymeric material in accordance with the prior invention suffers an approximate 10% loss of weight at 300 degrees C. and about a 90% loss at about 375 degrees C. Accordingly, the overlayer binder compositions of the present invention are much more resistant to thermal degradation in the presence of the high temperature electrical sparking involved in the electroerosion recording process.

The recording material according to this invention is a composite structure having a plastic or paper substrate 1. A translucent plastic is used for a direct negative. Paper or plastic is used for a direct master, or for a recording which is simply to be read directly. A hard, abrasion resistant, and hydrophobic coating layer 2 is applied to the substrate, and the coating is then covered with a thin conductive film 3 of aluminum deposited by the conventional sputter deposition or vacuum evaporation techniques, and an overlayer 4 comprising graphite or alternate solid lubricants in a polyorganosiloxane matrix. Because of the high silicon-oxygen content and the low organic content coupled with high thermal stability and low surface energy of the silicon containing binders in the overlayer of this invention as compared to the prior organic binders such as cellulose esters, an overall improvement in product quality and performance is achieved. The improvement is characterized by reduced scratching in the unwritten area and a reduced tendency for fouling or caking onto the styli due to the nonadherent nature of the debris that is generated during printing.

The substrate 1 is the same as typically used in the prior art and may be composed of polyester, polyethylene, polypropylene, or paper. On the support 1 there is provided a thin coating 2 of binder-filler dispersions such as silica loaded urethane crosslinked cellulose acetate butyrate. The conductive layer 3, typically aluminum, is sputter or vacuum evaporated over the base layer 2 to form a 100–500 Angstroms thick layer having a resistivity of about 0.5 to 5 ohm-centimeters. Other conductive films such as magnesium, chromium, and molybdenum are also applicable according to this invention.

The top lubricant or protective overlayer 4 is formed of dispersions of lubricating conductive laminar solids such as graphite, and $MoS_2$, and other solid lubricant particulate materials previously mentioned above, in polyorganosiloxane resins as discussed above. Various solvents that have been found suitable in the formulation of the overlayers 4 include: Isopropanol, n-butyl acetate, ethyl acetate, tetrahydrofuran, chlorinated solvents, toluene, isoamyl acetate, MEK, and n-butanol. Dispersions including the binder, the solid lubricant, and the solvent, are formed, for example, by ball milling and applied by a conventional web coating apparatus followed by drying at 100 to 120 degrees C for 2 to 10 minutes. The viscosity of the coating formulations subsequent to the dispersion process is adjusted by appropriate dilution with the solvent such that the thickness of the dry overcoat corresponds to 2 to 15 micrograms per square centimeter. The weight ratio of graphite lubricant to the polyorganosiloxane resin solids in the dispersion is preferably on the order of 3:2 to about 1:2. Thermal curing of such coatings results in a three dimensionally crosslinked polysiloxane network. This provides improved protection of the aluminum against corrosion and mechanical abrasion, and provides improved print quality in the generation of a direct negative.

A typical preferred polyorganosiloxane resin for overlayer application was synthesized according to the following procedure:

The following constituents were dissolved in 2 liters of toluene:

methyltrimethoxysilane, 132.7 grams (0.75 mole); phenylmethyldimethoxysilane, 18.2 grams (0.1 mole); trifluoropropyltrimethoxysilane, 21.8 grams (0.1 mole); vinyltrimethoxysilane, 7.8 grams (0.05 mole)

To the above solution, there is then added, dropwise, 53 grams of water followed by 0.1 milliliters of concentrated hydrochloric acid. The resultant exothermic reaction is moderated by cooling in an ice water bath. After 3 hours, the mixture is heated for 2 hours at reflux temperature to produce a condensation reaction. The solvent is then removed by rotary evaporation to provide a glassy solid which is referred to hereinafter as "polyorganosiloxane resin A".

The following are representative examples of the formulations for the overlayer using the above described resin and also using commercially available polyorganosiloxane resin materials:

EXAMPLE 1

| Constituent | Parts by Weight |
|---|---|
| Acheson Dag 154 (graphite dispersion) | 1.0 |
| Isopropanol | 6.0 |
| polyorganosiloxane resin A | 0.2 |
| n-Butyl acetate | 0.8 |
| A-1100 | 0.02 |

-continued

| Constituent | Parts by Weight |
|---|---|
| (crosslinking agent) | |

Acheson Dag 154 is a dispersion of graphite in a cellulosic binder with isopropanol as a solvent, which is available from Acheson Colloid Co. It contains 20% total solids in isopropanol with a graphite to binder ratio of 80:20. In addition to Acheson Dag 154, other suitable graphite products are commercially available from other sources such as from Graphite Products and Superior Graphite Corporation.
A-1100 is a gamma-aminopropyltriethoxysilane from Union Carbide Corporation.

The Acheson Dag 154 is mixed with 3.0 parts of isopropanol and ball milled for four hours to form a uniform dispersion which is then combined with a preformed solution of Resin A in n-butyl acetate followed by the addition of 2.5 parts isopropanol. This composition is thoroughly mixed, and prior to coating, a solution of A-1100 in 0.5 parts of isopropanol is added with good agitation to form the final overlayer coating formulation. This formulation is then applied on the metal layer, using conventional web coating apparatus followed by drying and curing at 100 to 120 degrees C. Various curing times were used on different samples in a range from 2 to 10 minutes and satisfactory results were obtained with all of these samples. The overlayer coatings were applied at various rates on different samples resulting in dry thicknesses of the resultant overlayer corresponding to a range from 2 micrograms to 15 micrograms per square centimeter. Satisfactory results were obtained with all of these samples.

When this recording material is employed for writing with an electro erosion device at 30-60 volts, clean erosion of aluminum, accompanied by the removal of the overlayer 4, is accomplished to form the written or imaged area with essentially no scratching of the unwritten area, and with considerably reduced debris and little fouling of the print head. This material may be used as a direct negative in a reproduction process or as a direct offset-master for the printing press.

For application as an offset-master, it is necessary to obtain hydrophilic-hydrophobic mapping so that when an oleophilic ink is employed, the written area remains ink receptive while the unwritten area is non-receptive to oil based inks. The printing material according to the present invention, with the overlayer of Example 1, provides a hydrophobic imaged region and can be employed as a direct master for offset printing. For this purpose, the lubricant overlayer 4 is removed from the unwritten areas with isopropanol, or other suitable solvent, which exposes the hydrophylic aluminum surface which is wetted easily by water and has water holding capacity. Other suitable solvents for removal of the overlayer include acetone, methanol, butanol, and butylacetate. Subsequent to the removal of the overlayer, the printed material is treated with a commercial plate cleaning solution and employed as an offset master using the standard water dampening-ink cycle on the printing press to generate more than 3000 copies of excellent quality.

EXAMPLE 2

An alternate overlayer formulation was prepared by substituting for "Resin A" (as described above) a polymerization product of methyltriethoxysilane with a molecular weight of about 12,000 which is commercially available from Owens Illinois Company under the trade name Glass Resin 650. All of the other constituents were the same and all of the other conditions were the same, and excellent results were achieved.

EXAMPLE 3

An overlayer formulation is prepared exactly as in Example 2, except that N-(3-trimethoxysilylpropylmorpholine) (Available from Petrarch Chemicals) was substituted for the A-1100, and an additional modifying agent, phenylmethyldimethoxysilane (0.02 parts by weight) was added to the coating formulation. The resulting overlayer formulation was applied on the metal layer 3 with subsequent heating at 110 degrees C. for 10 minutes. Electroerosion recording with this material provided a high contrast, essentially scratch-free direct negative which also functions, after removal of the overlayer, as a direct offset master for making multiple copies on the printing press using the conventional water-ink cycle.

EXAMPLE 4

| Constituent | Parts by Weight |
|---|---|
| Acheson Dag 154 (graphite dispersion) | 5.0 |
| Glass Resin 650 (polyorganosiloxane) | 2.5 |
| Isopropanol | 7.5 |
| Zinc Oxide | 1.0 |

(For a description of constituents, see Examples 1-3.)

The Glass Resin was first dissolved in isopropanol, and then combined with the graphite dispersion and zinc oxide. The mixture was ball milled for 16 hours to obtain a homogenous dispersion. Prior to coating, this dispersion was diluted with 20 parts of isopropanol and 0.25 parts of A-1100 was added as a 10% solution in isopropanol with constant stirring to obtain the final coating formulation. This was thoroughly mixed and applied on the metal layer 3, as described in Examples 1 and 2.

The multilayer structure thus completed can be employed for electro-erosion printing in order to generate direct negatives and offset masters for multiple copies.

The graphite bearing material in the above examples (Acheson-Dag 154) includes a cellulosic binder, which adds a small fraction of cellulose to the total binder of the completed composition. However, that amounts of cellulose is not sufficient to interfere with the properties provided by the polyorganosiloxane.

EXAMPLE 5

| Constituent | Parts by Weight |
|---|---|
| Polyorganosiloxane "Resin A" | 0.40 |
| Carbon Powder (Cabot XC-72) | 0.15 |
| Isopropanol | 5.0 |
| A-1100 | 0.08 |

The polyorganosiloxane "Resin A" is dissolved in 0.6 parts by weight of Isopropanol and mixed with the carbon powder using a high-speed blender for a few minutes. The mixture is then ball-milled for 14 hours. The resulting dispersion is then diluted with the remaining Isopropanol to obtain approximately 10% solids. The A-1100 is then added and mixed into the diluted dispersion, and the resultant coating material is applied as a lubricant coating upon an aluminized substrate followed by controlled drying and curing at 100 to 110 degrees C. The material is applied upon several samples at different rates to provide a dry thickness on the different samples in a range corresponding to an average weight of from 2 micrograms to 15 micrograms per square centimeter. The resultant multilayer structure can be successfully employed for electroerosion recording to generate direct negatives as in the previous examples.

Another important advantage of the polyorganosiloxane overlayer, as compared with other prior overlayers, including the cellulosic Ser. No. overlayers of the prior U.S. patent application 454,744 previously mentioned above, is that the polysiloxane overlayers may be applied at somewhat greater thickness to provide even better protection for the layer of conductive material without impairing the initiation of the spark necessary for the electroerosion recording process.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

Having thus described our invention, what we claim as new, and desire to secure by Letters Patent is:

1. An improved electroerosion recording material comprising a non-conductive support member, a thin layer of conductive material supported upon said support member and being removable by evaporation during electroerosion recording, an overlayer of protective lubricant composition on the stylus-contacting surface of said material, said lubricant composition comprising particles of high lubricity dispersed in a solid polyorganosiloxane binder, said polyorganosiloxane binder consisting predominately of a polymerization product of at least one trialkoxysilane monomer, the thickness of the overlayer corresponding to at least an average weight of about 2 micrograms per square centimeter.

2. A material as claimed in claim 1, wherein the high lubricity particles are selected from the group consisting of ZnO, $MoS_2$, $CaF_2$, PbO, Sn, Cu, Zn, Ag, Pb, Au, Bi, Al, and graphite.

3. A material as claimed in claim 1 or claim 2, wherein said layer of conductive material consists essentially of aluminum which is in the range from 100 to 500 Angstroms in thickness.

4. A material as claimed in claim 1 or claim 2, wherein the amount of binder in said overlayer is from 20 percent to 50 percent by weight.

5. A material as claimed in claim 1 or claim 2, wherein the thickness of said overlayer is in the range corresponding to an average weight of 2 to 15 micrograms per square centimeter.

6. A material as claimed in claim 1, wherein said trialkoxysilane monomers are selected from the group defined by the following

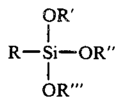

where R is $—CH_3$, $—C_2H_5$, $—C_3H_7$, $—CH_2CH_2CF_3$, $—C_6H_5$, or $—CH{=}CH_2$, and where R', R'', and R''' each equal $CH_3$ or $C_2H_5$.

7. A material as claimed in claim 6, wherein said polyorganosilane consists essentially of a polymerization product of methyltriethoxysilane with a molecular weight of about 12,000.

8. A material as claimed in claim 1 including a crosslinking agent for said polyorganosiloxane consisting essentially of at least one silane.

9. A material as claimed in claim 8, wherein said polyorganosiloxane is crosslinked with gamma-aminopropyltriethoxysilane.

10. An improved electroerosion recording material as claimed in claim 1, wherein said polyorganosiloxane consists essentially of a polymerization product of at least one trialkoxysilane monomer in combination with a lesser amount of at least one dialkoxysilane monomer, said polyorganosiloxane being crosslinked and modified with at least one agent consisting essentially of a silane.

11. A material as claimed in claim 10, wherein the dialkoxysilane monomer is selected from the group defined by the following formula:

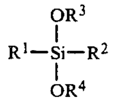

where $R^1$, $R^2$ each equal $—CH_3$, $—C_2H_5$, $—CH_2CH_2CF_3$, $—C_6H_5$, or $—CH{=}CH_2$, and where $R^3$, $R^4$ each equal $—CH_3$ or $—C_2H_5$.

12. A material as claimed in claim 10, wherein the initial proportion of trialkoxysilane monomer is about 80% and the initial proportion of dialkoxysilane monomer is about 20%.

13. A material as claimed in claim 1 or claim 5, wherein said particles of high lubricity are electrically conductive.

14. A material as claimed in claim 12, wherein the polymerization product of the trialkoxysilane monomer and the dialkoxysilane monomer is defined by the following formula:

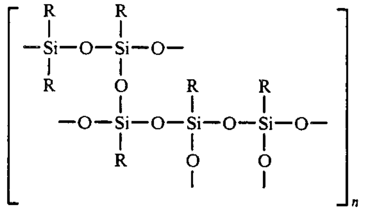

where n equals 5 to 50, and R, in each of the six sites, represents any one of the following listed hydrocarbon radicals, the hydrocarbon radicals being present in weight proportions as given in the following table:

| Hydrocarbon Radical | Weight in Percent |
|---|---|
| $—CH_3$ | 70 |
| $—C_6H_5$ | 15 |
| $—CH_2CH_2CF_3$ | 10 |
| $—CH{=}CH_2$ | 5. |

15. A material as claimed in claim 12, further comprising a thin, hard layer of crosslinked polymer between said support member and said conductive layer, said polymer layer serving to increase the resistance to scratching of said material during electroerosion recording.

16. The material as claimed in claim 15, wherein said layer of crosslinked polymer between said support member and said conductive layer is filled with silica particles.

17. A material as claimed in claim 10 or claim 14, wherein said silane is defined by the following formula:

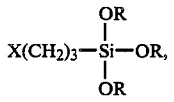

where X equals $-NH_2$, $-NHCH_3$, $-N(CH_2CH_2OH)_2$, or $-N(CH_2CH_2)_2O$, and R equals $-CH_3$, or $-C_2H_5$.

18. A recording material as claimed in claim 10 or claim 14, wherein said silane is selected from the following group of materials:
Bis(2-hydroxyethyl)aminopropyltriethoxysilane,
N-(3-trimethoxysilylpropyl)morpholine,
gamma-Aminopropyltriethoxysilane, and
gama-N-Methylaminopropyltrimethoxysilane.

19. A material as claimed in claim 10 or claim 14, wherein said high lubricity particles are conductive and consist essentially of graphite.

20. A material as claimed in claim 10 or 8, wherein said high lubricity particles are conductive and consist essentially of conductive ZnO.

* * * * *